(12) United States Patent
Eronen et al.

(10) Patent No.: US 11,272,286 B2
(45) Date of Patent: Mar. 8, 2022

(54) METHOD, APPARATUS AND COMPUTER PROGRAM FOR PROCESSING AUDIO SIGNALS

(71) Applicant: Nokia Technologies Oy, Espoo (FI)

(72) Inventors: Antti Eronen, Tampere (FI); Arto Lehtiniemi, Lempaala (FI); Jussi Leppanen, Espoo (FI); Veli-Matti Kolmonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 420 days.

(21) Appl. No.: 16/332,407

(22) PCT Filed: Sep. 8, 2017

(86) PCT No.: PCT/FI2017/050639
§ 371 (c)(1),
(2) Date: Mar. 12, 2019

(87) PCT Pub. No.: WO2018/050960
PCT Pub. Date: Mar. 22, 2018

(65) Prior Publication Data
US 2021/0289292 A1     Sep. 16, 2021

(30) Foreign Application Priority Data
Sep. 13, 2016  (GB) ..................... 1615538

(51) Int. Cl.
*H04R 3/04*     (2006.01)
*H04R 3/00*     (2006.01)
(Continued)

(52) U.S. Cl.
CPC .............. *H04R 3/005* (2013.01); *G10L 25/06* (2013.01); *G10L 25/51* (2013.01); *G11B 27/038* (2013.01);
(Continued)

(58) Field of Classification Search
CPC ......... G06F 3/167; G10L 15/20; G10L 25/06; G10L 25/51; G10L 25/93; G10L 21/0208;
(Continued)

(56) References Cited

U.S. PATENT DOCUMENTS 5,714,997 A *   2/1998   Anderson ............ G02B 27/017
                                                    348/39
8,154,588 B2 *  4/2012   Burns .................... H04S 7/303
                                                    348/61

(Continued)

FOREIGN PATENT DOCUMENTS

CN    102804806 A    11/2012
CN    103229517 A    7/2013
(Continued)

OTHER PUBLICATIONS

Mixing console, Wikipedia.org, Sep. 2, 2016, 9 pgs.

*Primary Examiner* — Gerald Gauthier
(74) *Attorney, Agent, or Firm* — Harrington & Smith (57) ABSTRACT

A method including obtaining a first clean signal and a first processed signal dependent upon audio input at a first microphone; obtaining a second clean signal and a second processed signal dependent upon audio input at a second microphone; using the first clean signal and the second clean signal to enable further processing of at least the first processed signal and the second processed signal.

20 Claims, 6 Drawing Sheets

(51) Int. Cl.
*G10L 25/06* (2013.01)
*G10L 25/51* (2013.01)
*G11B 27/038* (2006.01)
*G11B 27/10* (2006.01)
*H04R 1/40* (2006.01)
*H04R 29/00* (2006.01)
*H04S 7/00* (2006.01)

(52) U.S. Cl.
CPC ............. *G11B 27/10* (2013.01); *H04R 1/406* (2013.01); *H04R 29/005* (2013.01); *H04S 7/30* (2013.01); *H04S 2400/15* (2013.01)

(58) Field of Classification Search
CPC ........ G11B 27/038; G11B 27/10; H04R 1/08; H04R 1/406; H04R 3/005; H04R 3/04; H04R 5/02; H04R 5/04; H04R 25/407; H04R 29/005; H04S 7/30; H04S 2400/15; H04S 7/304; G10K 11/16
USPC ...... 381/56, 71.6, 71.8, 119, 306, 71.4, 317; 348/39, 61; 725/91
See application file for complete search history.

(56) References Cited

U.S. PATENT DOCUMENTS

| | | | |
|---|---|---|---|
| 9,094,749 B2 * | 7/2015 | Xie | H04R 5/027 |
| 9,196,238 B2 * | 11/2015 | Inha | H04S 7/303 |
| 9,432,768 B1 | 8/2016 | O'Neill | H04R 3/005 |
| 9,554,203 B1 | 1/2017 | Pavlidi | H04R 1/08 |
| 9,761,243 B2 * | 9/2017 | Taenzer | G10L 21/0216 |
| 9,799,330 B2 * | 10/2017 | Nemala | G10L 25/06 |
| 10,244,313 B1 * | 3/2019 | O'Neill | H04R 3/005 |
| 10,341,775 B2 * | 7/2019 | Vilermo | H04R 5/027 |
| 11,120,814 B2 * | 9/2021 | Li | H04R 3/005 |
| 2002/0048376 A1 | 4/2002 | Ukita | |
| 2003/0076966 A1 * | 4/2003 | Okabayashi | H04S 3/00 381/119 |
| 2008/0130925 A1 * | 6/2008 | Fischer | H04R 25/407 381/317 |
| 2010/0128881 A1 * | 5/2010 | Petit | G10L 25/93 381/56 |
| 2011/0085671 A1 | 4/2011 | Gibbs | |
| 2011/0103624 A1 * | 5/2011 | Ferren | H04N 7/142 381/306 |
| 2012/0057717 A1 * | 3/2012 | Nystrom | H04R 3/005 381/71.6 |
| 2012/0163606 A1 | 6/2012 | Eronen et al. | |
| 2013/0142343 A1 * | 6/2013 | Matsui | G10L 21/028 381/56 |
| 2013/0156204 A1 * | 6/2013 | Schulz | H04M 3/569 381/56 |
| 2014/0096167 A1 * | 4/2014 | Lang | H04N 21/4223 725/91 |
| 2014/0119548 A1 | 5/2014 | Kechichian et al. | |
| 2014/0348333 A1 * | 11/2014 | Fallat | G10L 21/02 381/56 |
| 2015/0078571 A1 * | 3/2015 | Kurylo | H04R 3/005 381/71.8 |
| 2015/0131805 A1 * | 5/2015 | Miwa | H04R 29/00 381/56 |
| 2015/0222996 A1 | 8/2015 | Chu et al. | |
| 2015/0264480 A1 * | 9/2015 | Talwar | H04R 1/406 381/71.4 |
| 2015/0380010 A1 | 12/2015 | Srinivasan | |
| 2016/0234609 A1 * | 8/2016 | Bendsen | H04R 25/407 |
| 2017/0034640 A1 * | 2/2017 | Kirsch | H04R 5/04 |
| 2017/0118555 A1 * | 4/2017 | Ebenezer | H04R 29/006 |
| 2017/0150254 A1 * | 5/2017 | Bakish | H04R 1/326 |
| 2017/0195793 A1 * | 7/2017 | Vilermo | H04R 29/004 |
| 2017/0339487 A1 * | 11/2017 | Alvord | B64C 39/024 |
| 2018/0061438 A1 * | 3/2018 | Love | G06F 3/165 |
| 2018/0359584 A1 * | 12/2018 | Maziewski | H04R 1/406 |
| 2021/0219091 A1 * | 7/2021 | Robinson | G10L 19/008 |
| 2021/0289292 A1 * | 9/2021 | Eronen | G11B 27/10 |

FOREIGN PATENT DOCUMENTS

| | | |
|---|---|---|
| CN | 104219013 A | 12/2014 |
| CN | 104778950 A | 7/2015 |
| CN | 105206281 A | 12/2015 |
| CN | 105308681 A | 2/2016 |
| GB | 2394391 A | 4/2004 |

* cited by examiner

METHOD, APPARATUS AND COMPUTER PROGRAM FOR PROCESSING AUDIO SIGNALS

CROSS REFERENCE TO RELATED APPLICATION

This patent application is a U.S. National Stage application of International Patent Application Number PCT/FI2017/050639 filed Sep. 8, 2017, which is hereby incorporated by reference in its entirety, and claims priority to GB 1615538.4 filed Sep. 13, 2016.

TECHNOLOGICAL FIELD

Examples of the present disclosure relate to a method, apparatus and computer program for processing audio signals. In particular, examples of the present disclosure relate to a method, apparatus and computer program for processing audio signals provided by a plurality of microphones.

BACKGROUND

Apparatus for processing audio signals are known. Sometimes it may be useful to mix or otherwise combine signals dependent upon audio input at different microphones.

For example, if a band or orchestra is creating music, different microphones may be positioned adjacent to different instruments and/or performers. The different audio signals provided by the different microphones may be mixed to provide a sound output.

It is beneficial to provide improved methods of processing the different audio signals provided by a plurality of microphones.

BRIEF SUMMARY

According to various, but not necessarily all, embodiments of the invention there may be provided a method comprising: obtaining a first clean signal and a first processed signal dependent upon audio input at a first microphone; obtaining a second clean signal and a second processed signal dependent upon audio input at a second microphone; using the first clean signal and the second clean signal to enable further processing of at least the first processed signal and the second processed signal.

According to various, but not necessarily all, embodiments of the invention there may be provided an apparatus comprising: means for obtaining a first clean signal and a first processed signal dependent upon audio input at a first microphone; means for obtaining a second clean signal and a second processed signal dependent upon audio input at a second microphone; means for using the first clean signal and the second clean signal to enable further processing of at least the first processed signal and the second processed signal.

According to various, but not necessarily all, embodiments of the invention there may be provided a method comprising: obtaining a first clean signal and a first processed signal dependent upon audio input at a first microphone; obtaining a second clean signal and a second processed signal dependent upon audio input at a second microphone; using the clean signals to obtain a time offset between the audio signals captured by the microphones; and using the time offset to enable further processing of at least the first processed signal and the second processed signal.

According to various, but not necessarily all, embodiments of the invention there may be provided a method comprising: obtaining audio signals including clean signals and processed signals dependent upon audio input at different microphones; and grouping the audio signals into groups, each group comprising audio signals dependent upon audio input at the same microphone.

According to various, but not necessarily all, embodiments of the invention there may be provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

The Figures illustrate a method comprising: obtaining 31 a first clean signal $S_1$ and a first processed signal $S_4$ dependent upon audio input 24 at a first microphone 25; obtaining 33 a second clean signal $S_2$ and a second processed signal $S_3$ dependent upon audio input 26 at a second microphone 27; using the clean signals $S_1$, $S_2$ to enable further processing 37 of at least the first processed signal $S_3$ and the second processed signal $S_4$.

Audio signals, including clean signals and processed signals, dependent upon audio input at different microphones, may be grouped into groups $G_n$ where each group $G_n$ comprises only audio signals $S_{nm}$ dependent upon audio input at the same microphone.

The first clean signal and the second clean signal may be used to obtain timing information which is used to enable further processing of at least the first processed signal and the second processed signal. The first clean signal and the second clean signal may be used to obtain a time offset between the audio signals from the microphones as the timing information. For example, the clean signals may be used to obtain a first intra-channel time offset between the first clean signal and the first processed signal and/or a second intra-channel time offset between the second clean signal and the second processed signal, as the timing information. For example, the clean signals may be used to obtain an inter-channel time offset between the first processed signal and the second processed signal as the timing information.

The method may be used to enable the different processed signals to be synchronized to a common time reference before further processing such as spatial audio mixing is performed on different processed signals.

Figure 1:
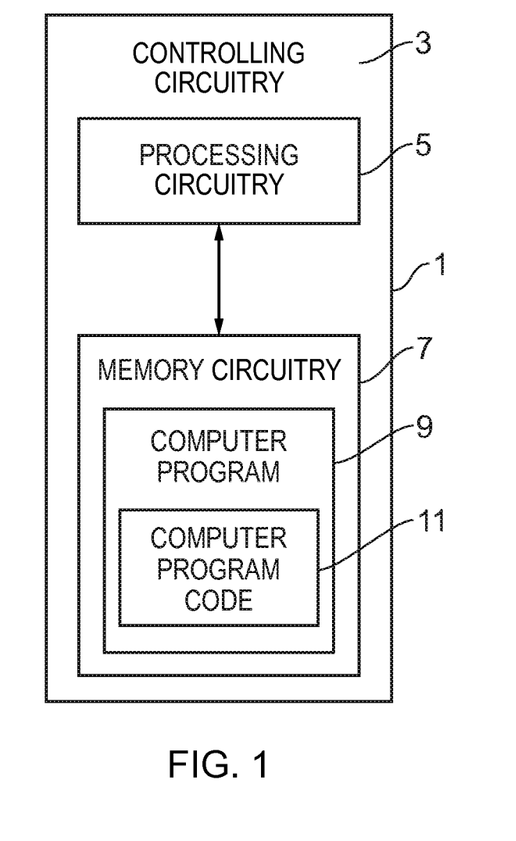
FIG. 1 illustrates an apparatus.

FIG. 1 schematically illustrates an example apparatus 1 which may be used in examples of the disclosure. The apparatus 1 illustrated in FIG. 1 may be a chip or a chip-set. In some examples the apparatus 1 may be provided within an electronic device 21. The electronic device 21 could be an audio mixing desk, a computer, a communications device or any other suitable electronic device 21.

The example apparatus 1 comprises controlling circuitry 3. The controlling circuitry 3 may provide means for controlling an electronic device 21. The controlling circuitry 3 may also provide means for performing the methods or at least part of the methods of examples of the disclosure.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods, or at least part of the example methods illustrated in FIGS. 3 to 6. The processing circuitry 5, by reading the memory circuitry 7, is able to load and execute the computer program 9.

In some examples the computer program 9 may comprise an audio signal processing application. The audio signal processing application may be arranged to obtain a plurality of audio signals 41, 43 from different microphones 25, 27 and enable processing of the audio signals. The processing may comprise mixing or other combinations of different audio signals obtained by different microphones.

The apparatus 1 therefore comprises: processing circuitry 5; and memory circuitry 7 including computer program code 11, the memory circuitry 7 and computer program code 11 configured to, with the processing circuitry 5, cause the apparatus 1 at least to perform: obtaining 31 a first clean signal $S_1$ and a first processed signal $S_4$ dependent upon audio input 24 at a first microphone 25; obtaining 33 a second clean signal $S_2$ and a second processed signal $S_3$ dependent upon audio input 26 at a second microphone 27; using the clean signals $S_1$, $S_2$ to enable further processing 37 of at least the first processed signal $S_4$ and the second processed signal $S_3$.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus 1 may enable the propagation or transmission of the computer program 9 as a computer data signal. In some examples the computer program code 11 may be transmitted to the apparatus 1 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 2:
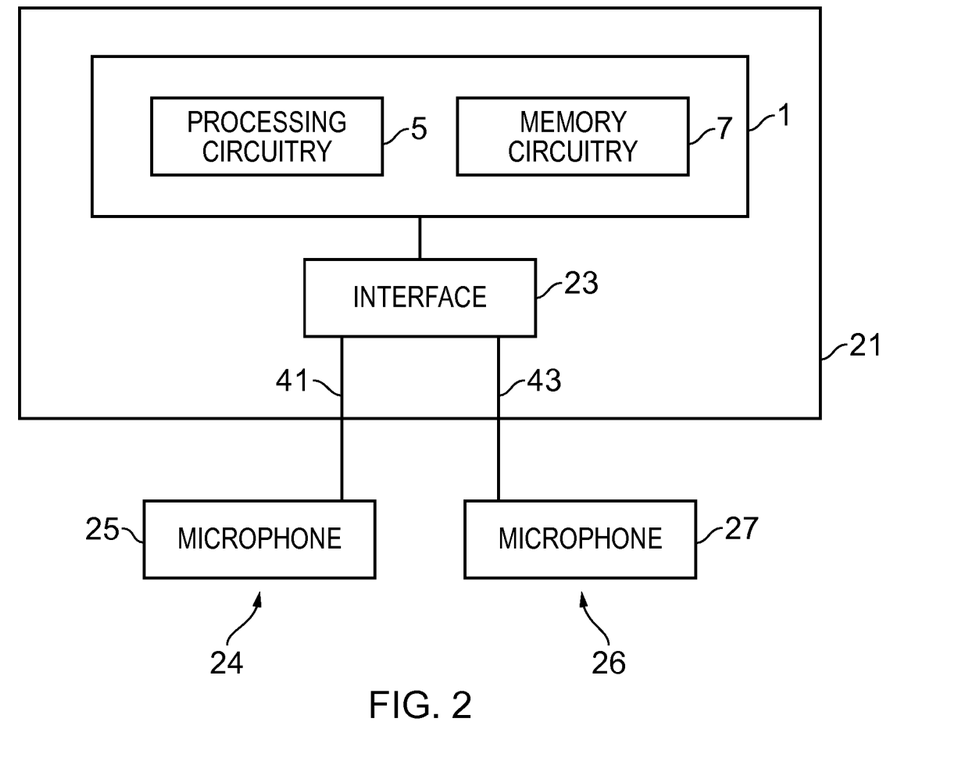
FIG. 2 illustrates an electronic device.

FIG. 2 schematically illustrates an example electronic device 21. The electronic device 21 comprises an apparatus 1 comprising processing circuitry 5 and memory circuitry 7 as described above. Corresponding reference numerals are used for corresponding features. In addition to the apparatus 1 the example electronic device 21 of FIG. 2 also comprises an interface 23. It is to be appreciated that the electronic device 21 may comprise other features which are not illustrated in FIG. 2 such as one or more microphones, image capturing devices or any other suitable features.

The interface 23 may comprise any means which may enable the electronic device 21 to receive or exchange information with one or more other electronic devices. In the example of FIG. 2 the interface 23 is arranged to enable the electronic device 21 to receive audio signals 41, 43 from a plurality of different microphones 25, 27. In some examples the interface 23 may be arranged to enable the electronic device 21 to receive, provide or exchange information with other types of devices such as image capturing devices, audio mixing desks or any other suitable electronic devices.

In some examples the interface 23 may comprise a wire or other physical connection. In such examples the wire or physical connection may extend between the microphones 25, 27 and the electronic device 21.

In other examples the interface 23 may comprise means for enabling wireless communication. For example, the interface 23 may comprise one or more transceivers which may enable a wireless communication connection between the electronic device 21 and the microphones 25, 27. The wireless communication connection may be a short range wireless communication connection or any other suitable type of wireless communication connection.

In the example of FIG. 2 a plurality of microphones 25, 27 are provided external to the electronic device 21. In the example of FIG. 2 two microphones 25, 27 are provided. It is to be appreciated that one, two or more microphones 25, 27 may be used in examples of the disclosure.

For example, there may be at least one extra microphone, a spatial audio capture microphone, which provides a spatial audio signal. The extra spatial audio capture microphone may be a linear array of microphones for example. The audio signals 41, 43 from microphones 25 and 27 are subsequently mixed using spatial audio processing with the spatial audio signal of the extra spatial audio capture microphone(s).

The microphones 25, 27 may comprise any means which may be configured to convert an audio input 24, 25 to an electrical output signal (audio signal 41, 43). The microphones 25, 27 may be coupled to the apparatus 1 via the interface 23 to enable the apparatus 1 to process audio signals 41, 43 provided by the microphones 25, 27.

The microphones 25, 27 may be spatially separated from each other so that there is a time delay in the audio signals 41, 43 provided by the different microphones 25, 27. This is an inter-microphone (inter-channel) time delay.

The apparatus 1 may be arranged to determine the inter-channel time delay between the respective audio signals 41, 43 and use the inter-channel time delay when performing processing, such as spatial audio mixing, on audio signals 41, 43 provided by the microphones 25, 27.

Each microphone 25, 27 may capture different audio inputs 24, 26. Each microphone 25, 27 may capture a different sound source. The audio signals 41, 43 provided by the microphones 25, 27 may represent different recorded sound objects. The audio signals 41, 43 may be processed, using spatial audio processing, to produce rendered sound objects. The rendered sound objects may correspond to the recorded sound objects. However, the spatial audio processing can change characteristics of a rendered sound object and/or a position at which a rendered sound object is rendered relative to a listener. The spatial audio processing may for example selectively introduce relative delays between audio signals, selectively introduce relative gain between audio signals, selectively introduce reverberation with variable gains for an audio signal.

In some but not necessarily all examples one or both of the microphones 25, 27 may be a stationary microphone.

In some but not necessarily all examples one or both of the microphones 25, 27 may be a movable microphone such as a boom microphone or an up-close, worn microphone such as a Lavalier microphone.

In the example of FIG. 2 the microphones 25, 27 are located externally to the electronic device 21. The microphones 25, 27 are located outside of the casing of the electronic device 21. In other examples one or more microphones could be located within the electronic device 21. Such microphones may be located within the casing of the electronic device 21 and may be arranged to provide audio signals 41, 43 to the apparatus 1 to enable the apparatus 1 to process the audio signals 41, 43.

In the example of FIG. 2 the microphones 25, 27 are arranged to provide audio signals 41, 43 directly to the electronic device 21. In some examples there may be other intervening devices between the microphones 25, 27 and the electronic device 21. For example a processing device such as an audio mixing desk 49 may be provided between the microphones 25, 27 and the electronic device 21. The audio mixing desk 49 may be arranged to perform pre-processing of the audio signals 41, 43 provided by the microphones 25, 27.

Figure 3A:
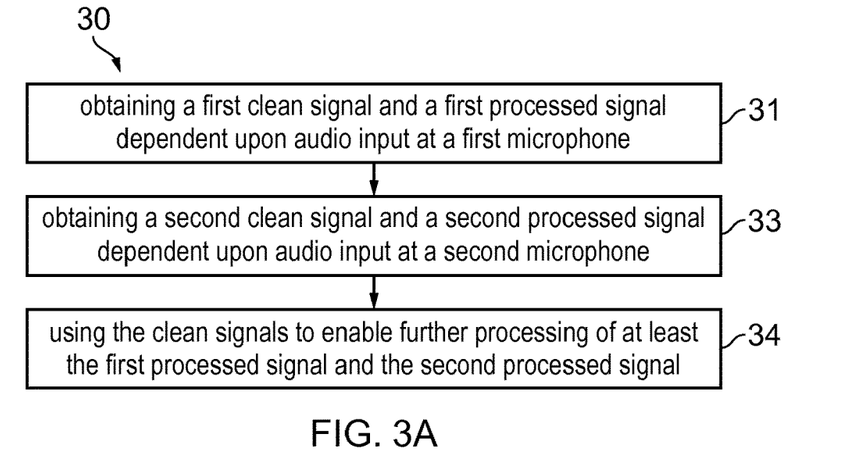
FIG. 3A, 3B, 3C illustrate examples of methods.

FIG. 3A illustrates a method 30. The method may be implemented using apparatus 1 and electronic devices 21 as described above. The method 30 comprises: obtaining 31 a first clean signal $S_1$ and a first processed signal $S_4$ dependent upon audio input 24 at a first microphone 25; obtaining 33 a second clean signal $S_2$ and a second processed signal $S_3$ dependent upon audio input 26 at a second microphone 27; using the clean signals $S_1$, $S_2$ to enable further processing 34 of at least the first processed signal $S_3$ and the second processed signal $S_4$.

Figure 3B:
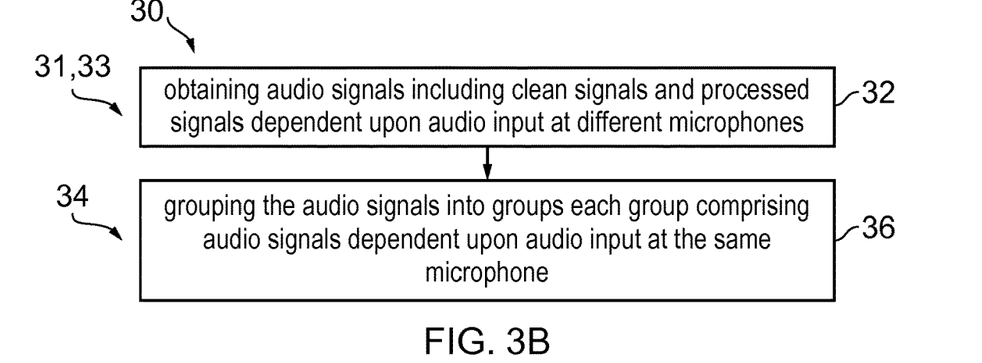
Figure 3C:
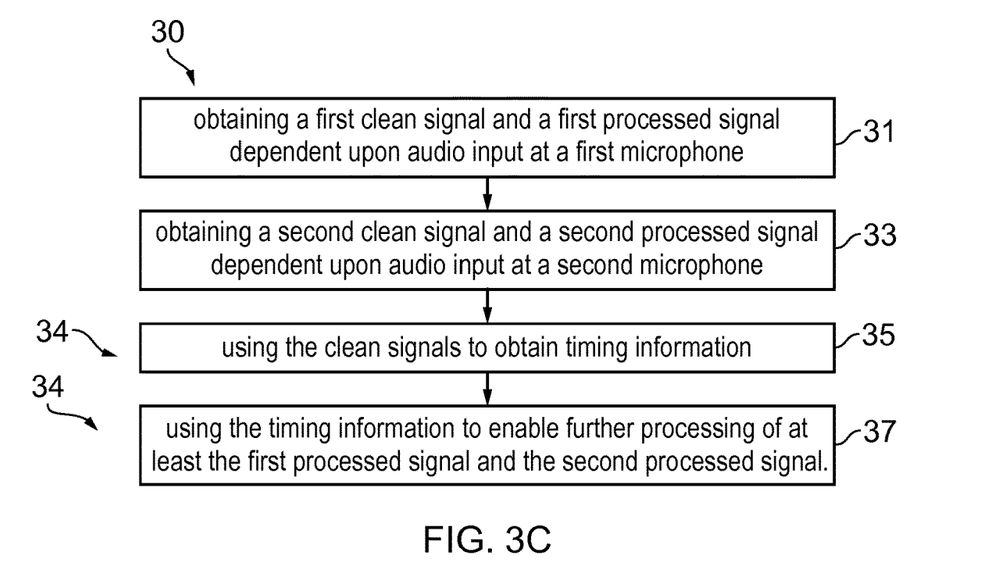

FIG. 3B illustrates an example of the method 30 of FIG. 3A and similar references are used for similar features. The method may be implemented using apparatus 1 and electronic devices 21 as described above. In this example, the method 30 comprises: obtaining 32 audio signals including clean signals $S_1$ $S_2$ and processed signals $S_3$ $S_4$ dependent upon audio input 24, 26 at different microphones 25, 27; and grouping 36 the audio signals $S_1$ $S_2$ $S_3$ $S_4$ into groups $G_1$ $G_2$, each group comprising audio signals dependent upon audio input 24, 26 at the same microphone 25, 27.

The groups $G_n$ are pairs, each pair $G_n$ consisting of a clean signal $S_{n1}$ and a processed signal $S_{n2}$ both of which are dependent upon audio input at the same microphone $M_n$. For example group $G_1$ consists of the clean signal $S_{11}$ (first clean signal $S_1$) and the processed signal $S_{12}$ (first processed signal $S_4$) dependent upon audio input 24 at the first microphone 25. For example group $G_2$ consists of the clean signal $S_{21}$ (second clean signal $S_2$) and the processed signal $S_{22}$ (second processed signal $S_3$) dependent upon audio input 26 at the second microphone 27.

Having performed inter-group discrimination and generated groups $G_n$ in association with each microphone $M_n$, the method 30 then performs intra-group discrimination and discriminates the audio signals within a group $G_n$ into a clean signal $S_{n1}$ and a processed signal $S_{n2}$.

FIG. 3B illustrates an example of the method 30 of FIG. 3A and similar references are used for similar features. The method may be implemented using apparatus 1 and electronic devices 21 as described above.

In this example, the method 30 comprises, at block 31, obtaining a first clean signal $S_1$ and a first processed signal $S_4$ dependent upon audio input 24 at a first microphone 25 and at block 33 the method comprises, obtaining a second clean signal $S_2$ and a second processed signal $S_3$ dependent upon audio input 26 at a second microphone 27.

The method also comprises, at block 35 using the clean signals $S_1$, $S_2$ to obtain timing information; and using at block 37 the timing information to enable further processing of at least the first processed signal $S_4$ and the second processed signal $S_3$.

The method may, for example, comprise at block 35 using the first clean signal and the second clean signal to obtain a time offset 61 between the audio signals 41. 43 provided by the microphones 25, 27 as the timing information and at block 37 comprise using the time offset 61 to enable further processing of at least the first processed signal $S_4$ and the second processed signal $S_3$.

The first clean signal may be used to obtain a first intra-channel time offset between the first clean signal and the first processed signal as the timing information or part of the timing information. The second clean signal may be used to obtain a second intra-channel time offset between the second clean signal and the second processed signal, as the timing information or part of the timing information.

The first clean signal and the second clean signal may be used to obtain an inter-channel time offset between the first clean signal and the second clean signal as the timing information which provides the time offset between the first processed signal and the second processed signal.

Figure 4:
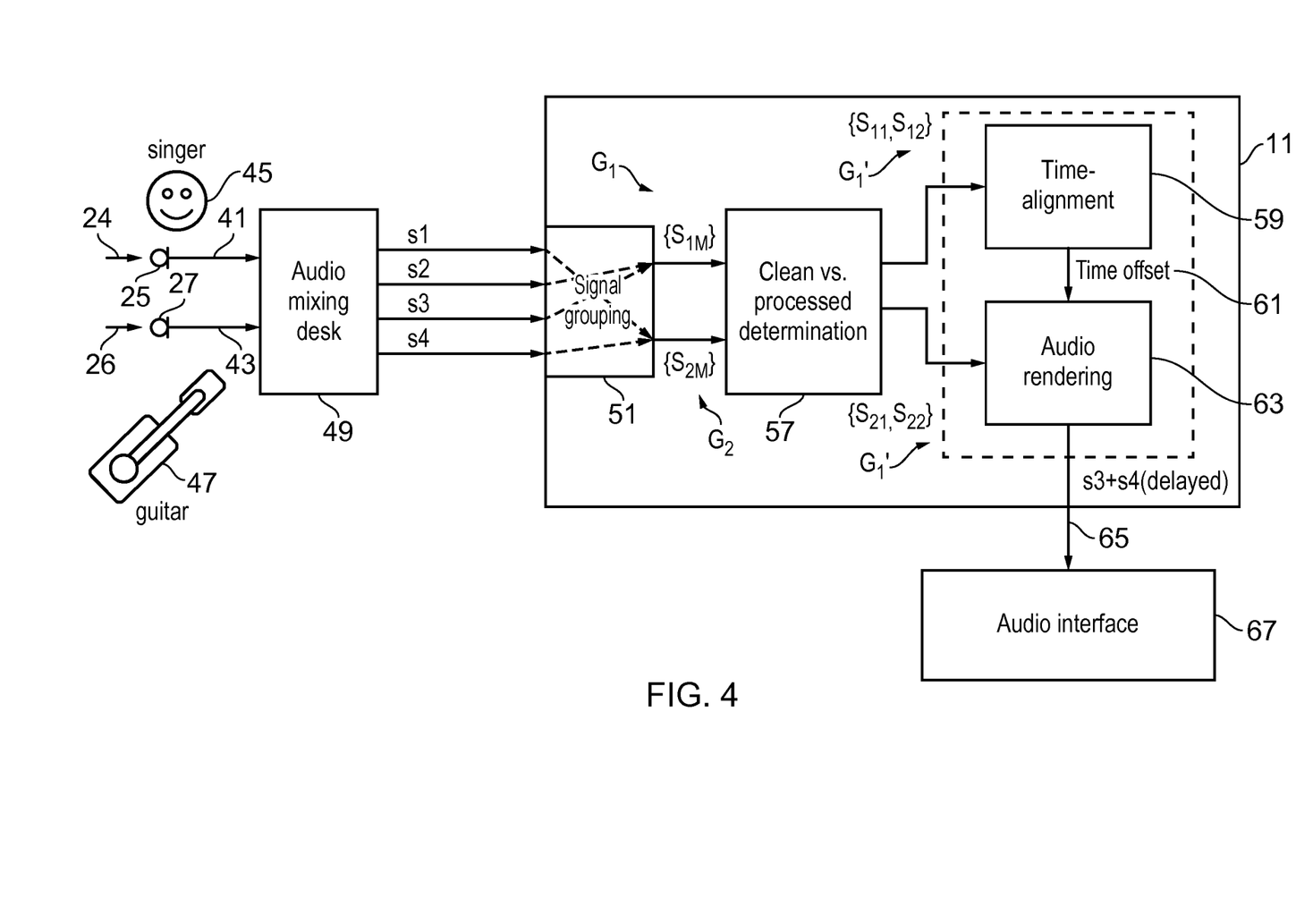
FIG. 4 illustrates a method.

FIG. 4 illustrates another example of the method 30 which may be implemented using apparatus 1 and electronic devices 21 as described above.

In the example of FIG. 4 a first microphone 25 is arranged to capture a first audio input 24 and produce a first audio signal 41 and a second microphone 27 is arranged to capture a second audio input 26 and produce a second audio signal 43.

In the example of FIG. 4 the first microphone 25 is arranged to capture the first audio signal 41 from a first sound source 45 and the second microphone 27 is arranged to capture the second audio signal 43 from a second sound source 47. In the example of FIG. 4 the first sound source 45 is a singer and the second sound source 47 is a guitar. The respective microphones 25, 27 may be positioned close to the respective sound sources 45, 47 to ensure that the microphones 25, 27 capture sounds from the respective sound sources 45, 47.

The first microphone 25 may be provided as a static microphone or a movable microphone. The second microphone 27 may be provided as a static microphone or a movable microphone.

The audio signals 41, 43 are provided to an audio mixing desk 49. The audio mixing desk 49 is arranged to convert the audio signals 41, 43 into clean signals and processed signals.

In some but not necessarily all examples of the disclosure a clean signal may comprise an unprocessed raw signal from a microphone. In such examples the audio mixing desk 49 may be arranged so that no processing is performed on the clean signal.

In other examples some processing may be performed on audio signals 41, 43 to obtain the clean signals. The processing that is performed might not involve any non-linear processing (which would affect the determination of a time offset). For example, the production of a clean signal may comprise no processing or only linear processing of a raw signal from a microphone. An example of linear processing is adjusting the gain of the audio signals 41, 43.

The audio mixing desk 49 may also be arranged to process the audio signals 41, 43 to obtain processed signals. Any suitable processing may be performed to provide the processed signals. Such processing is, however, different from processing, if any, used to produce the clean signals. For example a characteristic of each audio signal may be modified by the processing used to produce the processed signals that is not modified by processing, if any, used to produce the clean signals. Thus processed signals may comprise at least one characteristic that is an artefact of the processing used to produce the processed signal and which can be used to discriminate clean signals from processed signals. The production of a processed signal may comprise non-linear processing of a raw signal from a microphone. In some examples the processing may comprise adding reverb, pitch correction, applying compression such as dynamic range compression, non-linear filtering or any other suitable processing. The processing that is performed may depend on the types of sound sources that are captured, the types of microphones used, the intended use of the output signals and/or any other suitable factors.

In the example of FIG. 4 N (N=2, in this example) audio signals 41, 43 are provided to the audio mixing desk 49 and in response the audio mixing desk 49 provides M (M=2N=4, in this example) output signals. The output signals comprise a clean singing signal $S_1$, a processed singing signal $S_4$, a clean guitar signal $S_2$ and a processed guitar signal $S_3$. It is to be appreciated that where more sounds sources and/or microphones are used (N>2) the audio mixing desk 49 would provide more than four output signals.

The output signals $S_1$, $S_2$, $S_3$ and $S_4$ are provided to an apparatus 11. In some examples the apparatus 11 may be provided within the audio mixing desk 49. In other examples the apparatus 11 may be provided within a separate electronic device 21.

Once the output signals $S_1$, $S_2$, $S_3$ and $S_4$ have been obtained by the apparatus 11, the apparatus 11 is arranged to group 51 the obtained signals $S_1$, $S_2$, $S_3$ and $S_4$ into groups $G_n$ of audio signals that originate from the same microphone $M_n$. Inter-group discrimination discriminates the audio signals into groups $G_n$ each associated with one channel/microphone $M_n$, Each group $G_n$ may comprise Xn audio signals.

In this example, the groups $G_n$ are pairs, each pair $G_n$ consisting of a clean signal $S_{n1}$ and a processed signal $S_{n2}$ both of which are dependent upon audio input at the same channel/microphone $M_n$.

For example first group $G_1$ consists of the first clean signal $S_{11}$ (the first singer clean signal $S_1$) and the first processed signal $S_{12}$ (the first singer processed signal $S_4$) dependent upon audio input 24 at the first microphone 25

For example second group $G_2$ consists of the second clean signal $S_{21}$ (the first guitar clean signal $S_2$) and the second processed signal $S_{22}$ (the second guitar processed signal $S_3$) dependent upon audio input 24 at the second microphone 27

Thus in the example of FIG. 4 the signals $S_1$, $S_4$ originating from the singer 45 and the first microphone 25 are arranged into a first group $G_1$ and the signals $S_2$, $S_3$ originating from the guitar 43 and the second microphone 27 are arranged into a second group $G_2$. It is to be appreciated that in examples where more microphones 23, 25 and/or sound sources 45, 47 are used there would be more groups $G_n$ of signals.

The grouping of the signals ensures that the signals $S_1$, $S_2$, $S_3$ and $S_4$ are matched correctly for further processing.

The apparatus 11 may be arranged to perform the grouping fully automatically without any input from a user or semi-automatically in response to a user input.

Figure 5:
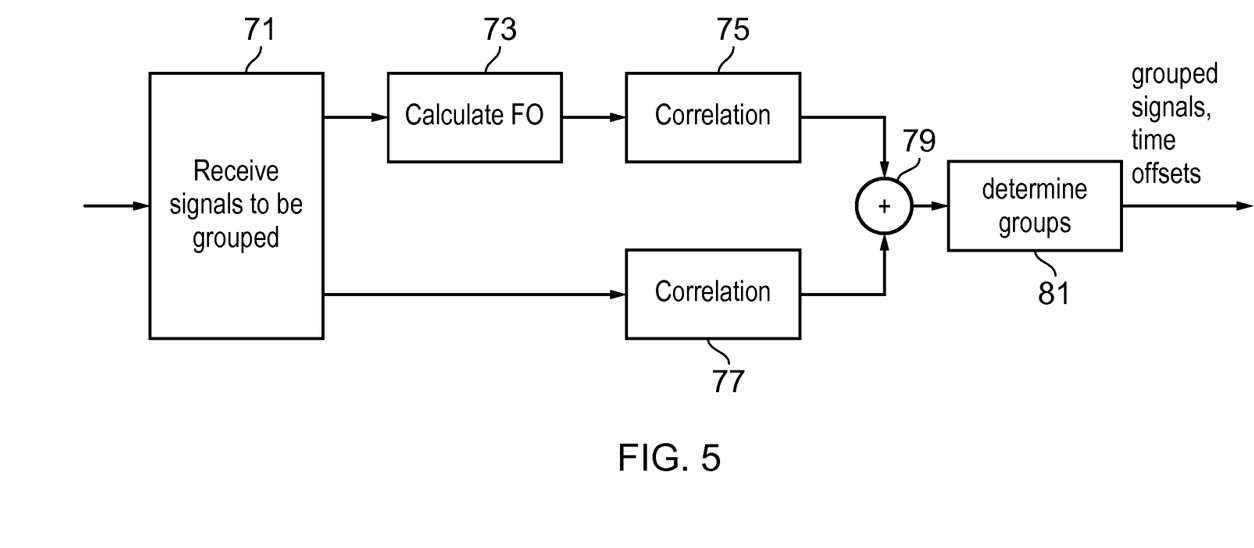
FIG. 5 illustrates a method.

Any suitable process may be used to group the obtained signals $S_1$, $S_2$, $S_3$ and $S_4$ into their respective groups. FIG. 5 shows an example of a method that may be used for inter-group discrimination and the details of this method will be described later.

Figure 6:
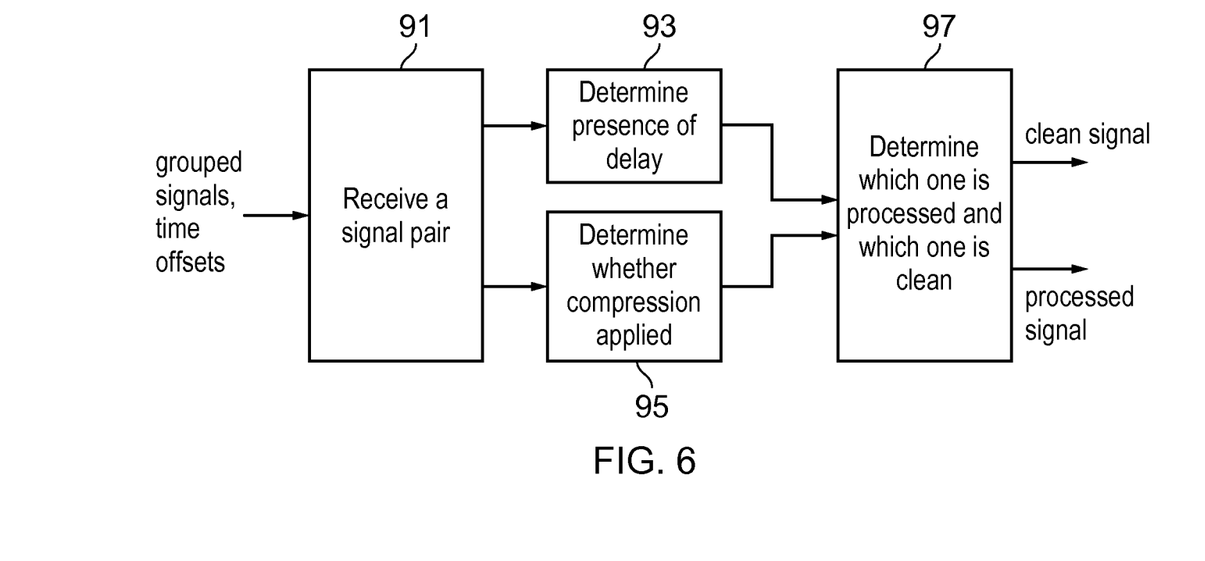
FIG. 6 illustrates a method.

The apparatus 11 is also arranged to discriminate 57 the audio signals within an as-yet signal un-discriminated group $G_n$ into a clean signal $S_{n1}$ and a processed signal $S_{n2}$. to produce a signal discriminated group $G_n'$. Any suitable process may be used to identify 57 the clean signal $S_{n1}$ and the processed signal $S_{n2}$ within the group $G_n$ of signals. FIG. 6 shows an example of a process that may be used in some examples of the disclosure for intra-group discrimination and the details of this method will be described later.

In the example of FIG. 4 it is identified that $S_1$ and $S_2$ are the clean signals and that $S_3$ and $S_4$ are the processed signals.

In this example, the clean signals $S_{11}$, $S_{21}$ are used to obtain a time offset 61.

The clean signals $S_{n1}$ may be provided to a time alignment module 59 within the apparatus 11 to enable the time offset 61 to be obtained. The time offset 61 may be provided within an output signal from the time alignment module 59.

The time offset determination may be done by comparing the signals $S_{11}$, $S_{21}$ to a signal $S_S$ from a spatial audio capture microphone placed at a desired listening point. Thus, there might be time offsets $T_n$, one $T_1$ for $S_{11}$ and another $T_2$ for $S_{21}$ which indicate the time offsets of the respective signal (channel) compared to the signal (channel) of the spatial audio capture microphone.

Any suitable processes may be used to obtain the time offset 61 from the clean signals $S_{n1}$. The processes may comprise audio based cross-correlation or any other suitable process.

In example of FIG. 4 only clean signals $S_{n1}$ are used to obtain the time offset.

The processed signals $S_{n2}$ are provided to an audio rendering module 63 within the apparatus 11 to enable further processing. The time offset 61 between the groups $G_n$ of signals is also provided to the audio rendering module 63. The time offset 61 may enable the processed signals $S_{n2}$ to be synchronised to a common time frame, this allows the singing signal $S_4$ and the processed guitar signal $S_3$ to be synchronised.

The further processing may comprise mixing, for example spatial; audio mixing, or any other suitable combination of the processed signals $S_{n2}$. In the example of FIG. 4 the mixing may comprise weighted summing, with weighted relative delays, the processed guitar signal $S_3$ with a time shifted processed singing signal $S_4$. The processing may further comprise summing the result of this first summing with at least one signal from the spatial audio capture microphone.

In some examples the further processing may comprise spatial audio processing that generates one or more spatial audio signals. In the example of FIG. 4 the spatial audio mixing may comprise weighted summing, with weighted relative delays, the processed guitar signal $S_3$ and the processed singing signal $S_4$ with or without reverberated versions, with weighted relative delays, of the processed guitar signal $S_3$ and the processed singing signal $S_4$. The processing may further comprise summing the result of this first summing with at least one signal from the spatial audio capture microphone. For instance, if the output is in a loudspeaker or binaural format the processing may be arranged so that the sound sources 45, 47 are mapped to specific positions, for example, the locations of the microphones 25, 27 and/or with specific characteristics.

Once the further processing has been performed an output signal 65 comprising the further processed audio signals may be provided to an audio interface 67 to enable the further processed signal to be rendered.

In the example of FIG. 4 only two microphones 25, 27 and two sound sources 45, 47 have been shown for simplicity. It is to be appreciated that any number of microphones 25, 27 and/or sound sources 45, 47 may be used in other examples of the disclosure.

In the example of FIG. 4 the microphones 25, 27 may be arranged to capture audio input e.g. music generated by a plurality of different sound sources 45, 47. The music could be generated by a band or orchestra or any other arrangement. It is to be appreciated that examples of the disclosure could be used in other examples.

For instance in some examples one or more microphones 25, 27 may be provided in an image capturing device. The image capturing device could be a presence capture device or any other suitable type of image capturing device. The presence capture device may be arranged to obtain panoramic images or any other suitable types of images. The presence capture device may also be associated with other external microphones which may be arranged to capture additional audio signals. In some examples the external microphones may be positioned so that the external microphones are closer to the sound sources than the presence capture device is. Examples of the disclosure may enable the audio signals provided by the external microphones to be synchronized with audio signals provided by microphones within the image capturing device and/or with any other external microphones. In some instances, the examples of the disclosure may enable the audio signals to be synchronized with the images captured by the presence device.

FIG. 5 illustrates an example of a method for inter-group discrimination that discriminates the audio signals into groups $G_n$ each associated with one channel/microphone $M_n$, The grouping comprises grouping the most similar audio signals. Similarity may be determined by comparing cross-correlations for the audio signals.

Similarity may be determined over different time epochs by, for example, comparing low-frequency time variations of audio signals over time and by comparing higher frequency variations of audio signals over time.

For example, similarity may be determined by comparing low-frequency amplitude variation (waveform variation) of the audio signals over time.

For example, similarity may be determined by comparing variation of spectra of the audio signals over time by, for example, comparing variation of fundamental frequency of the audio signals over time.

In the example of FIG. 5 a method is used to group the obtained signals $S_1$, $S_2$, $S_3$ and $S_4$. The example method may be implemented using an apparatus 1 and electronic devices 21 as which may be as described above. The grouping enables the clean signal and the processed signal originating from each microphone 25, 27 to be grouped into pairs. The grouping may comprise identifying similarities between pairs of signals and grouping the most similar signals together.

At block 71 a plurality of clean and processed signals are received. The clean and processed signals may be dependent upon audio input at a plurality of microphones 25, 27. In some examples a clean signal and a processed signal may be provided for each of the microphones 25, 27 within the system. The processing may be performed by an audio mixing desk 49 or any other suitable device before the plurality of signals are obtained by the apparatus 11.

At block 73 a fundamental frequency $F_0$ is calculated for short contiguous portions (frames) of the audio signals. The fundamental frequency may be, for example, the primary spectral component or pitch. Each frame may, for example be 40 ms in duration. The fundamental frequency $F_0$ may be calculated for each of the plurality of input signals for each of a temporal sequence of frames to produce a 'trajectory' for each audio input signal. The trajectory records, for an audio input signal, how its fundamental frequency $F_0$ varies over time. The fundamental frequency $F_0$ for each frame may be calculated using any suitable method. In some examples the fundamental frequency $F_0$ may be calculated using the YIN algorithm or any other suitable process, for example, cross-correlation, fast Fourier transform, cepstrum based methods.

At block 75 a cross-correlation is calculated for each pair of the fundamental frequency trajectories that are calculated at block 73.

At block 77 a cross correlation is calculated for each pair of the audio waveforms of the plurality of input signals. The audio waveform is the amplitude envelope that bounds an input audio signal.

At block 79 the cross-correlation coefficients calculated at blocks 75 and 77 are summed and at block 81 the summed cross-correlation coefficients are used to group the signals into groups $G_n$ of signals from the same channel/microphone.

A cross correlation $r_{fg}$ may be defined as $$r_{fg}[n] = (f*g)[n] = \sum_{m=-\infty}^{\infty} f^*[m]g[m+n]$$

where f and g are the signals to be cross-correlated and [ ] is an index. The index may be the time index at block 77 where the cross correlation is calculated for the audio waveforms. The index may be a frame index at block 75 where the cross correlation is calculated for the fundamental frequency $F_0$.

The maximum correlation coefficient which is obtained at block 79 may be defined as $$r_{fg} = \max(f*g)[n]$$

The example method of FIG. 5 may be used in the example of FIG. 4 where two sound sources 45, 47 captured by and two microphones 25, 27 provide processed and clean signals. In such examples a total of four signals $S_1$, $S_2$, $S_3$ and $S_4$ are received at block 71. The example method of FIG. 5 may be used to calculate the maximum correlation coefficients $r_{12}$, $r_{13}$, $r_{14}$, $r_{23}$, $r_{24}$, $r_{34}$, where the index refers to each of the four input signals $S_1$, $S_2$, $S_3$ and $S_4$.

The maximum correlation coefficients $r_{12}$, $r_{13}$, $r_{14}$, $r_{23}$, $r_{24}$, $r_{34}$ are then used to identify the most similar signals to sort the signals into groups.

The maximum correlation coefficients $r_{12}$, $r_{13}$, $r_{14}$, $r_{23}$, $r_{24}$, $r_{34}$ may be for the cross correlation of the audio waveforms (block 77), the cross-correlation of the fundamental frequency trajectories (block 73) or for the sum of the cross correlation of the audio waveforms and the cross-correlation of the fundamental frequency trajectories (block 79).

The most similar signals may be identified by sorting the calculated maximum correlation coefficients $r_{12}$, $r_{13}$, $r_{14}$, $r_{23}$, $r_{24}$, $r_{34}$ into decreasing order of magnitude. The pairs of signals may be identified as the pairs that correspond to the largest maximum correlation coefficients.

For instance, in the example of FIG. 4 the largest maximum correlation coefficient may be $r_{14}$. This indicates that signals $S_1$ and $S_4$ are from the same microphone/channel and so, at block 81 signals $S_1$ and $S_4$ are grouped into a pair as group $G_1$. Once signals $S_1$ and $S_4$ have been grouped any maximum correlation coefficients which relate to either signal $S_1$ or signal $S_4$ may be excluded as these signals have been arranged into a group. Once these values have been removed the next largest maximum correlation coefficient may be identified to obtain the next pair of signals that are grouped into a pair as group $G_2$. In the example of FIG. 4 the next largest maximum correlation coefficient will be $r_{23}$ which indicates that signals $S_2$ and $S_3$ are from the same microphone/channel and may be grouped into a pair as group $G_2$.

In the above described examples $r_{23}$ will be the only remaining maximum correlation coefficient after any maximum correlation coefficients which relate to either signal $S_1$ or signal $S_4$ may be excluded. However it is to be appreciated that the methods of FIGS. 4 and 5 may be used in other examples with more than two microphones 25, 27 and so the respective blocks of the method may need to repeated a plurality of times to enable all of the received signals to be grouped into pairs.

In some examples of the disclosure the time lags between the maximum correlation values may be calculated for use in determining the time offset 61. The maximum correlation lag may be defined as $$\tau_{fg} = \arg_n \max(f*g)[n]$$

In the above described example the received input audio signals only comprise pairs of clean and processed signals. In some examples the received input audio signals may comprise one or more clean signals for which there is no corresponding processed signals and/or one or more processed signal for which there is no corresponding clean signal (singular signals, which have no corresponding pair). In such examples the grouping process may be arranged so that such singular signals are not incorrectly paired. For example the un-discriminated grouping of signals $G_n$ may only be a putative grouping until it has become a discriminated grouping $G_n'$ at which point, because it correctly comprises an identified pair of a clean signal and a processed signal, it becomes a final grouping. Should processing of an un-discriminated grouping of signals $G_n$ indicate that it does not comprise a pair of a clean signal and a processed signal then that grouping may be flagged as a forbidden grouping, then the initial groupings to produce the un-discriminated groupings $G_n$ may be fully or partially re-done with the constraint that the forbidden grouping is not allowed. In this way, the process will correctly pair signals, even in the presence of singular signals.

A threshold for the maximum correlation values required to create an un-discriminated group $G_n$ may be used so that signals are only grouped as an un-discriminated group $G_n$ if their maximum cross-correlation values are above the threshold.

FIG. 6 illustrates an example method that may be used to identify the clean signal and the processed signal within each of the un-discriminated groups $G_n$ of signals to form discriminated groups $G_n'$ of signals Discriminating clean signals and processed signals may comprise analysing at least one audio signal characteristic that is modified by processing used to produce the processed signals and is not modified by processing, if any, used to produce the clean signals.

As an example, the analysis may comprise analysing at least one audio signal characteristic to identify an artefact of non-linear processing used to produce the processed signal. Such an artefact may, for example, be identified by analysing for relative compression between the audio signals. Such an artefact may, for example, be identified by analysing for relative delay (caused by processing) between the audio signals.

In the example of FIG. 6, a method is used to discriminate the clean signal and the processed signal within each of the groups $G_n$ of signals. The example method may be carried out at block 57 of the example method of FIG. 4.

At block 91 the groups $G_n$ of signals are received. In the example of FIG. 4 two groups $G_1$ $G_2$ of signals are received. It is to be appreciated that more groups of signals may be received in other examples of the disclosure.

In the example of FIG. 6 the time offsets are also received at block 91. The time offsets may be obtained from the maximum correlation lag.

At block 93 the time delay in each of the signals within a group $G_n$ is determined. The time delay may be determined using any suitable method. In some examples the time delay may be determined from the location of the maximum cross correlation value.

At block 95 the presence of compression in each of the signals within a group is determined. The presence of compression may be determined using any suitable means. In some examples the presence of compression may be determined by calculating the frame-wise root-mean-square energy of inputs and then calculating the ratio of the 0.7 quartile to the 0.3 quartile. The input signal which has the larger ratio, is determined to have had compression applied.

At block 97 it is determined which of the signals within each group $G_n$ is the clean signal $S_{n1}$ and which signal is the processed signal $S_{n2}$. The signal which exhibits delay and which has compression applied may be determined to be the processed signal $S_{n2}$. The signal which does not have a delay and which has no compression applied may be determined to be the clean signal $S_{n1}$.

Examples of the disclosure provide a method of obtaining a time offset which can be used for further processing of audio signals. This ensures that a correct time alignment can be used for a plurality of different audio signals.

In examples of the disclosure the time offset is obtained automatically with no direct input needed from the user. Both the grouping of the signals and the identification of the clean and processed signals can be performed without requiring any specific input from the user.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the disclosure have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   obtaining from a first mixer a first audio signal including a first clean signal and a first processed signal dependent upon audio input at a first microphone;
   obtaining from a second mixer a second audio signal including a second clean signal and a second processed signal dependent upon audio input at a second microphone;
   grouping audio signals including the first audio signal and the second audio signal into at least two groups, a first group of the at least two groups comprising audio signals dependent upon the audio input at the first microphone and a second group of the at least two groups comprising audio signals dependent upon the audio input at the second microphone;
   discriminating between clean signals and processed signals in the first group and in the second group, wherein the first group comprises, at least, the first clean signal and the first processed signal, wherein the second group comprises, at least, the second clean signal and the second processed signal;
   using the first clean signal of the first group and the second clean signal of the second group to obtain a time offset between the audio signals captured with the first microphone and the second microphone; and
   using the time offset to enable further processing of at least the first processed signal and the second processed signal.

2. The method as claimed in claim 1, wherein the at least two groups are pairs, wherein a pair consists of a clean signal and a processed signal, both of which are dependent upon audio input at a same microphone, wherein the first mixer comprises the second mixer.

3. The method as claimed in claim 1, wherein the grouping comprises grouping at least two audio signals that are determined to be similar.

4. The method as claimed in claim 3, wherein the determined similarity is based on at least one of:
   comparing cross-correlations for the at least two audio signals;
   over different time epochs; or
   comparing low-frequency amplitude variation of the at least two audio signals over time and fundamental frequency variation of the at least two audio signals over time.

5. The method as claimed in claim 1, wherein discriminating between the clean signals and the processed signals comprises at least one of:
   analysing at least one characteristic of audio signals in a group of the at least two groups that is modified via processing used to produce the processed signals and is not modified during production of the clean signals;

analysing at least one characteristic of the audio signals in the group that is an artefact of non-linear processing used to produce the processed signals; or analysing compression for the audio signals in the group.

6. The method as claimed in claim 1, further comprising at least one of:

using the clean signals to obtain a first intra-channel time offset between the first clean signal and the first processed signal as the time offset;

using the clean signals to obtain a second intra-channel time offset between the second clean signal and the second processed signal as the time offset; or using the clean signals to obtain an intra-channel time offset between the first processed signal and the second processed signal as the time offset.

7. The method as claimed in claim 1, further comprising using cross-correlation to determine the time offset.

8. The method as claimed in claim 1, wherein the first clean signal is an unprocessed raw signal from the first microphone and wherein the second clean signal is an unprocessed raw signal from the second microphone.

9. The method as claimed in claim 1, further comprising at least one of:

causing production of a processed signal with the first or second mixer, wherein the production comprises non-linear processing of a raw signal from one of the first or second microphones;

causing production of a clean signal with the first or second mixer, wherein the production does not comprise non-linear processing of the raw signal from said one of the first or second microphones; or causing production of a clean signal with the first or second mixer, wherein the production comprises at least one of: no processing or linear processing of the raw signal from the one of the first or second microphones.

10. The method as claimed in claim 1, wherein the further processing of at least the first processed signal and the second processed signal comprises at least one of:

mixing at least the first processed signal and the second processed signal; or spatial audio mixing of at least the first processed signal and the second processed signal.

11. The method as claimed in claim 1, wherein the first microphone comprises a static microphone and the second microphone comprises a movable microphone.

12. An apparatus comprising:

processing circuitry; and memory circuitry including computer program code, the memory circuitry and the computer program code configured to, with the processing circuitry, enable the apparatus to cause performance of the method of claim 1.

13. An audio processing device comprising the apparatus as claimed in claim 12.

14. A method comprising:

obtaining a first clean signal and a first processed signal dependent upon audio input at a first microphone;

obtaining a second clean signal and a second processed signal dependent upon audio input at a second microphone;

using the first and second clean signals to obtain a time offset between the audio signals captured with the first and second microphones; and using the time offset to enable further processing of at least the first processed signal and the second processed signal.

15. The method as claimed in claim 14, further comprising:

obtaining audio signals including the first and second clean signals and the first and second processed signals dependent upon audio input at different microphones; and grouping the audio signals into groups, wherein a group comprises audio signals dependent upon audio input at a same microphone.

16. A method comprising:

obtaining a first clean signal and a first processed signal dependent upon audio input at a first microphone;

obtaining a second clean signal and a second processed signal dependent upon audio input at a second microphone; and using the first clean signal and the second clean signal to enable further processing of at least the first processed signal and the second processed signal, wherein the first clean signal and the second clean signal comprise signals that are at least one of:

an unprocessed raw signal, or a signal that has not been processed using non-linear processing.

17. The method as claimed in claim 16, further comprising:

obtaining audio signals including the first and second clean signals and the first and second processed signals dependent upon audio input at different microphones; and grouping the audio signals into groups, wherein a group comprises audio signals dependent upon audio input at a same microphone.

18. The method as claimed in claim 17, comprising discriminating clean signals and processed signals in the groups of audio signals.

19. The method as claimed in claim 16, further comprising at least one of:

using the first clean signal and the second clean signal to obtain timing information; or using the timing information to enable the further processing of at least the first processed signal and the second processed signal.

20. The method as claimed in claim 19, comprising using the first clean signal and the second clean signal to obtain a time offset between audio signals from the first and second microphones as the timing information.

* * * * *